United States Patent [19]

Liu et al.

[11] 4,292,865
[45] Oct. 6, 1981

[54] TOOL HOLDER FOR VARYING TOOL RAKE ANGLE

[75] Inventors: Chunghorng R. Liu, 765-8 San Antonio Rd., Palo Alto, Calif. 94303; Jnaneshwar H. Nayak, Stanford, Calif.; Herbjorn Stenberg; Felipe J. Huerta, both of Palo Alto, Calif.; Woodrow A. Hall, San Jose, Calif.

[73] Assignee: Chunghorng R. Liu, West Lafayette, Ind.

[21] Appl. No.: 101,980

[22] Filed: Dec. 10, 1979

Related U.S. Application Data

[63] Continuation of Ser. No. 824,530, Aug. 15, 1977, abandoned.

[51] Int. Cl.[3] .................................................. B23B 29/12
[52] U.S. Cl. ................................. 82/36 R; 82/34 R; 407/83; 407/89
[58] Field of Search ................. 82/36 R, 20, 34 R; 407/81–84, 89, 113

[56] References Cited

U.S. PATENT DOCUMENTS

| | | | |
|---|---|---|---|
| 1,606,718 | 11/1926 | Orup | 407/83 |
| 1,752,653 | 4/1930 | Ridler | 407/83 |
| 2,498,881 | 2/1950 | Eldridge | 407/8 |
| 2,962,800 | 12/1960 | Swenson | 407/89 |
| 3,125,798 | 3/1964 | Stein | 407/83 |
| 3,253,322 | 5/1966 | Christian | 407/89 |
| 3,329,048 | 7/1967 | Ward | 82/36 R |
| 3,455,189 | 7/1969 | Sweet | 82/36 R |
| 3,520,042 | 7/1970 | Stier | 407/113 |
| 3,744,358 | 7/1973 | Lindemann | 82/20 |
| 3,851,551 | 12/1974 | Bergstrom et al. | 407/83 |

OTHER PUBLICATIONS

"Adaptive Control of Machine Tools", by B. S. Balakshin, pub. by Mashinostrdente, Moscow, 1973.

*Primary Examiner*—Leonidas Vlachos
*Attorney, Agent, or Firm*—Phillips, Moore, Weissenberger, Lempio & Majestic

[57] ABSTRACT

A tool holder constituting an adaptive machining control system to automatically manipulate tool rake angle using in-process force feedback. The tool holder includes a rotatable member for holding a cutting member which cuts a workpiece, a motor to rotate the holding member, and a sensor and control logic to sense cutting forces and activate the motor to rotate the holding member and change the tool rake angle. The cutting member is held so that it rotates about an axis through its cutting tip to change the rake angle without varying the depth of cut on the workpiece. In an alternative embodiment, a manually operated tool holder is manipulated to similarly rotate a cutting member to vary the rake angle.

2 Claims, 12 Drawing Figures

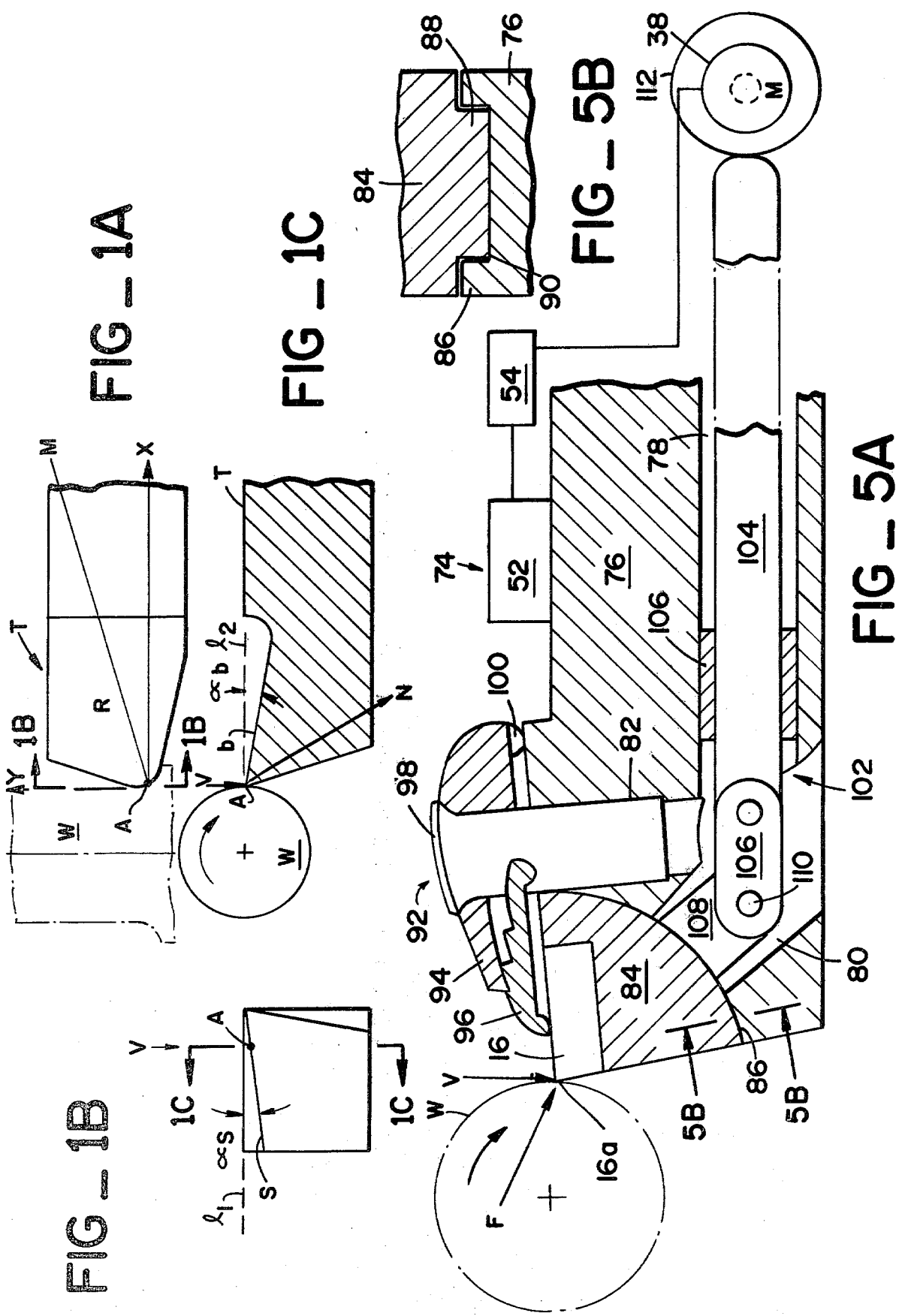

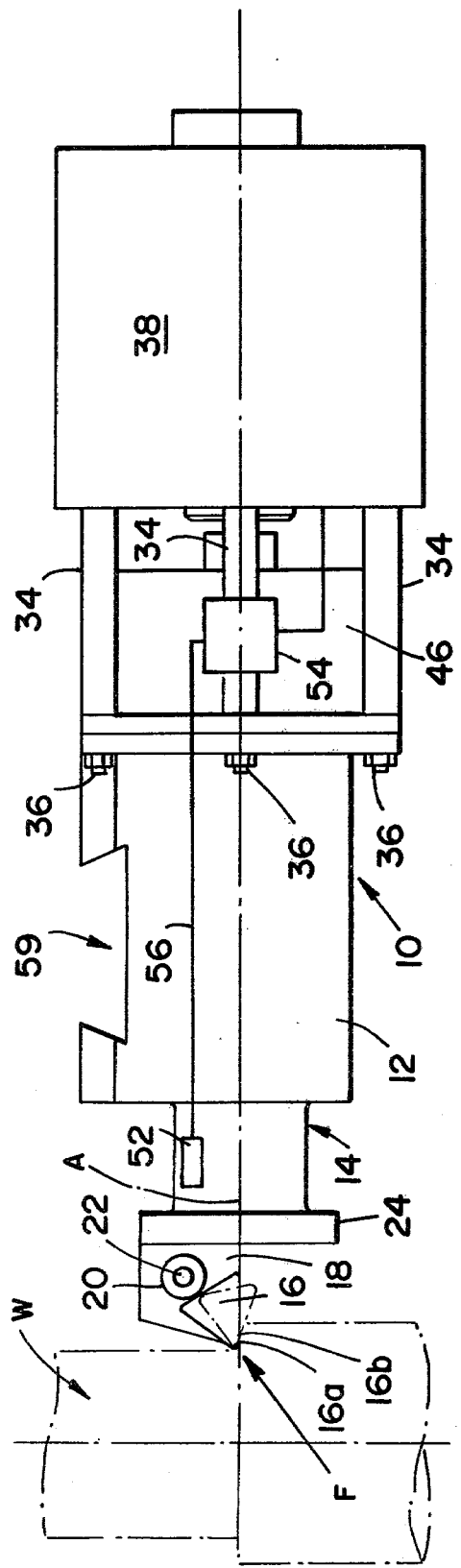
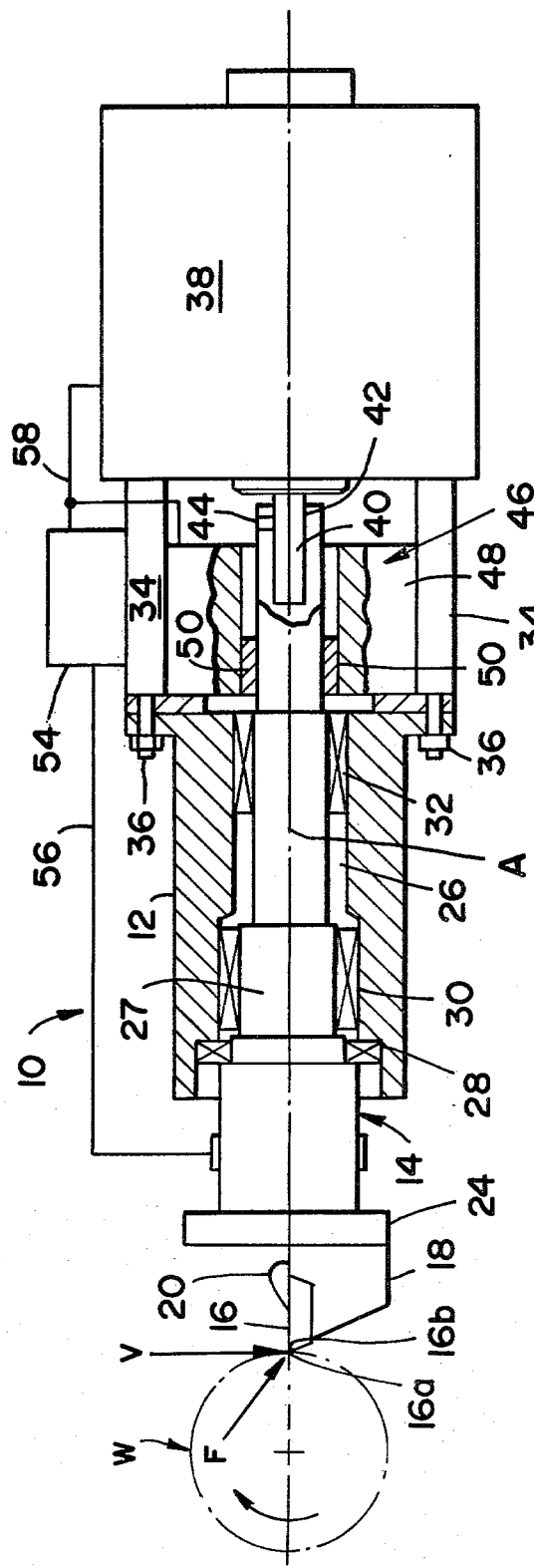
FIG_2
FIG_3

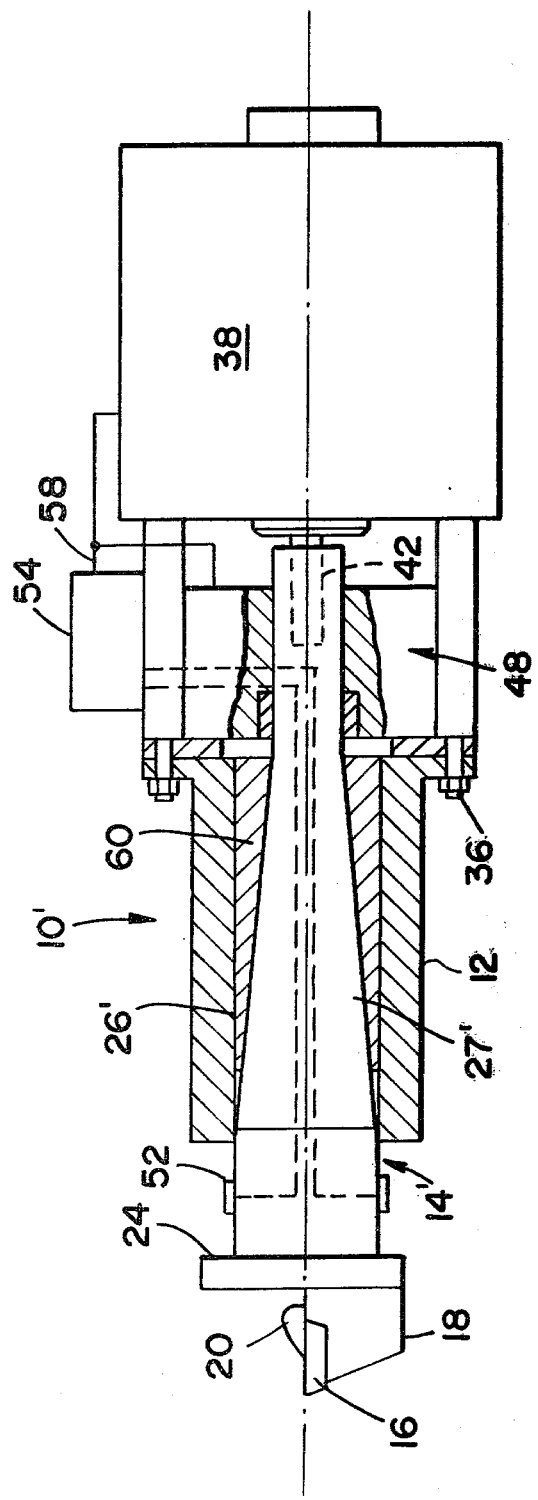
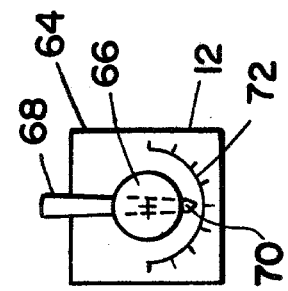
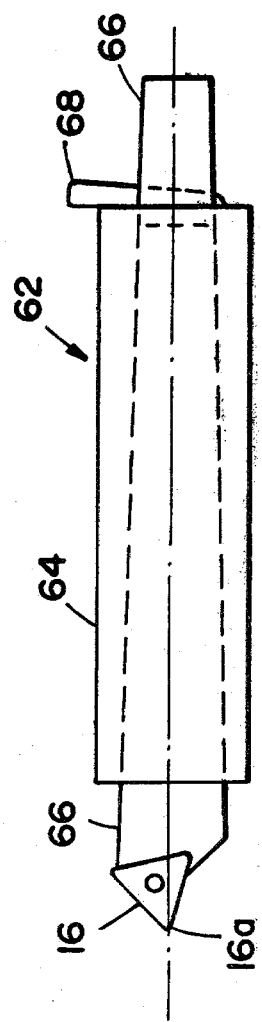
FIG_4
FIG_4A
FIG_4B

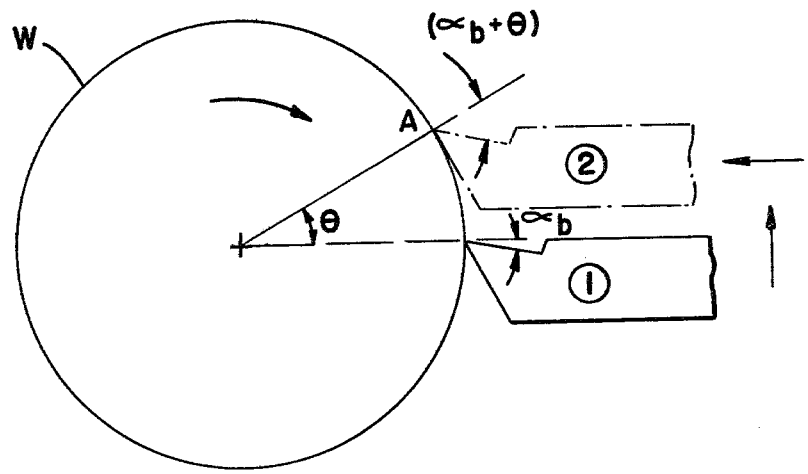
FIG_6A
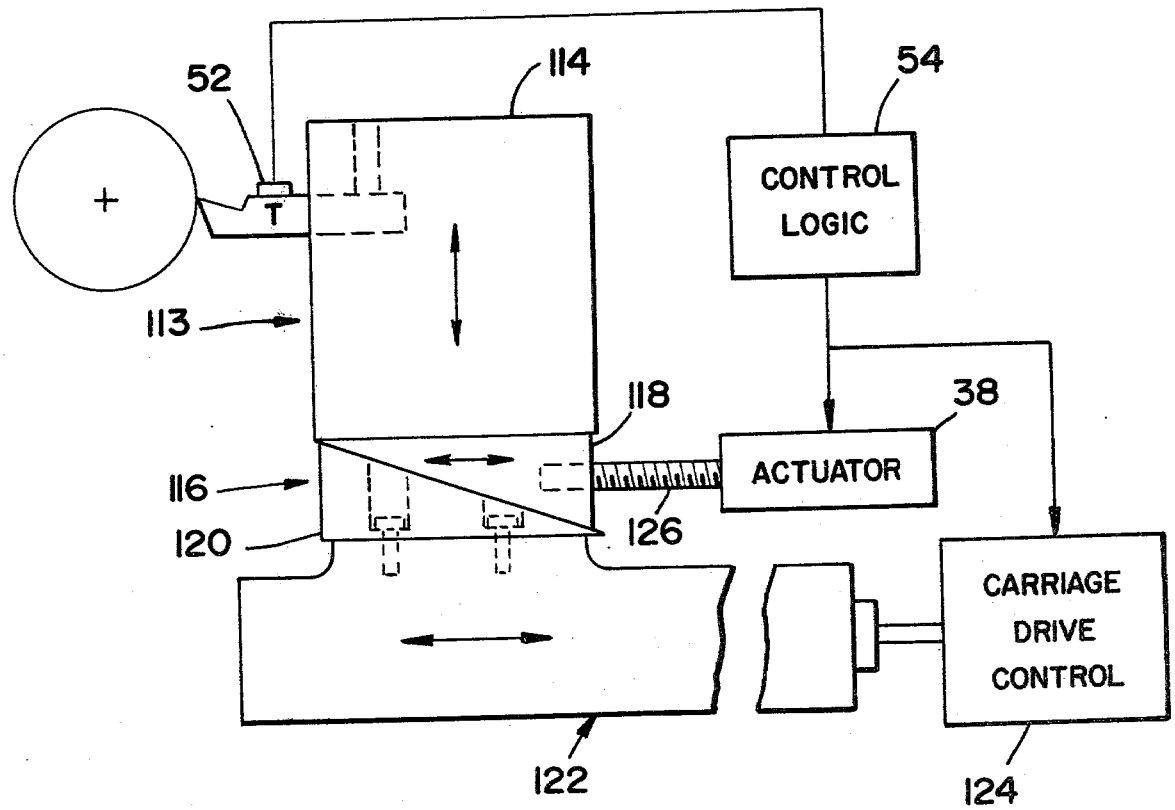
FIG_6B

4,292,865

TOOL HOLDER FOR VARYING TOOL RAKE ANGLE

This is a continuation of Ser. No. 824,530, filed Aug. 15, 1977, and now abandoned.

BACKGROUND OF THE INVENTION

This invention relates to apparatus for removing material from a workpiece with a tool and, more particularly, to apparatus for changing the rake angle of a given tool.

In the mechanical processing of materials, the shape, size or properties of a given workpiece are altered. Those processes in which the size and shape are changed by removing material with a tool are classified as metal cutting. In practice, all operations such as turning, boring, drilling, milling, reaming, tapping, and cutting fall into this single category of metal cutting.

In a metal cutting process, an important parameter governing the cutting conditions, such as cutting force, is known as rake angle. This angle, which will be described in detail below, is determined in part by a face on the tool known as the rake face. Usually, tools with different rake faces are selected for different cutting conditions so that, for example, one rake angle is used for machining a brass workpiece and a different rake angle is used for machining steel.

In current practice, a tool or cutting member having a particular rake face is fixed on a tool holder whereby the tool rake angle is fixed and cannot be changed. If, for example, workpieces of different materials are to be machined, either different tools having different rake faces should be used for the machining operation, or a given tool have its rake face reground. This, of course, is disadvantageous in that there is required a number of different tools for machining workpieces of different material, or additional time and expense is needed in regrinding a given tool to machine the different materials.

Moreover, the deflection of a workpiece is related to cutting force. That is, during the machining of a workpiece in, for example, a lathe operation, a constant cutting force on a cylindrical workpiece may cause varying degrees of deflection of the workpiece, with a greater deflection occurring at the central portion of the workpiece where it is unsupported and a lesser deflection at the end of the workpiece where it is supported. This can undesirably result in dimensional non-uniformity of the cut workpiece. Since a change in rake angle can change the cutting forces, it is desirable to improve dimensional uniformity by changing the rake angle in-process, i.e., while the workpiece is being cut.

SUMMARY OF THE INVENTION

It is an object of the present invention to provide a novel apparatus for cutting a workpiece.

It is another object of the present invention to provide apparatus for changing the rake angle with a given tool or cutting member.

Another object of the present invention is to provide simple and inexpensive apparatus for automatically, or manually, controlling the rake angle before or during a metal cutting operation to change the cutting conditions, such as cutting force and cutting temperature, which will consequently affect, for example, tool life.

A further object of the present invention is to provide an adaptive control apparatus to manipulate the tool rake angle using in-process cutting force feedback.

A yet further object of the present invention is to provide an apparatus for changing the rake angle with minimum movement of a tool holder.

These and other objects of the present invention are obtained in one aspect of the invention through the use of a rotatable member which holds a cutting member in a manner to enable the cutting member to rotate about an axis through its cutting tip, and means for rotating the rotatable holding member to change the rake angle. By this relatively simple rotational movement, the rake angle can be easily varied prior to machining to obtain the optimum rake angle for, for example, cutting a workpiece of a particular material. Also, by rotating the cutting member about an axis through its tip, the rake angle can be varied during the machining of a workpiece to change the cutting conditions such as cutting force without changing the depth of cut.

In another aspect of the invention, the apparatus is an adaptive control apparatus and includes a movable holder for the cutting member, a sensor to sense a condition of the material removing process and generate a control signal corresponding to the sensed condition, and an actuator, responsive to the control signal, to move the holder to change the rake angle. For example, during removal of the material from the workpiece, the cutting condition is sensed and this information used to activate the actuator. The cutting member holder will thereby be moved to automatically change the rake angle to an optimum value. In this aspect of the invention, the cutting member holder may be moved rotationally or otherwise to change the rake angle.

BRIEF DESCRIPTION OF THE DRAWINGS

FIG. 1A is a plan view of a cutting tool

FIG. 1B is an end view taken along lines B—B of FIG. 1A.

FIG. 1C is a sectional view taken along lines C—C of FIG. 1B.

FIG. 2 is a plan view of one embodiment of the invention.

FIG. 3 is a side view, partly in section, of the embodiment of FIG. 2.

FIG. 4 is a side view of an alternative embodiment of the invention of FIGS. 2 and 3.

FIG. 4A is a plan view of another embodiment of the invention.

FIG. 4B is an end view of the embodiment of FIG. 4A.

FIG. 5A is a side view, in section, of a still further embodiment of the invention.

FIG. 5B is a section taken along lines 5B—5B of FIG. 5A.

FIG. 6A is an illustration of the principle of yet another embodiment of the invention.

FIG. 6B is a diagrammatic illustration of an embodiment for carrying out the principle shown in FIG. 6A.

DETAILED DESCRIPTION OF THE DRAWINGS

While the invention will be described in relation to the machining operation of cutting with a lathe tool, the principles of the invention apply equally to other material removing processes which may be classified generically as metal cutting, such as milling, drilling, boring or planing. Also, while the invention will be described in American standard lathe tool nomenclature, the principles of the invention apply equally to German and British systems, which have a different standard.

FIGS. 1A–1C are views of a lathe cutting tool T helpful to describe rake angle and which show standard lathe tool geometry adopted by the American Standards Association. A detailed description of metal cutting including rake angle is described in "Metal Cutting Principles", by M. C. Shaw, Third Edition, MIT Press, U.S.A., 1968. A comparison of the definition of rake angle of a lathe cutting tool of American, German and British standards can be found in Chapter 13 of this book. FIGS. 1A–1C are copied from this chapter with minor modifications to more clearly describe the invention.

As shown in FIGS. 1B and 1C, a cutting tool T has two rake angles comprising a side rake angle $\alpha_s$ and a back rake angle $\alpha_b$. FIGS. 1B and 1C also show a velocity vector V which represents the relative movement of the workpiece W, shown partially and in phantom in FIGS. 1A and 1C, with respect to the tool T. Note that FIGS. 1A–1C also show the cutting tip A of the tool T and that FIG. 1A shows the rake face R of the tool T. As shown for purposes of this invention the side rake angle $\alpha_s$ is defined as the angle between the end projection s of the tool for rake face R and a line $l_1$ which is perpendicular to the velocity vector V, and the back rake angle $\alpha_b$ is defined as the angle between the side projection b of the rake face R and a line $l_2$ which is perpendicular to the velocity vector V. Also, as indicated by FIG. 1A, the cutting tip A is defined as the point of the tool T which would generate the subsequent workpiece outer dimension after cutting.

As noted, the standard lathe tool geometry includes the two rake angles $\alpha_s$ and $\alpha_b$. Also, as will be described for this invention, the cutting tool T can rotate about any axis going through the cutting tip A, such as axes AX, AY, AM or AN shown in FIGS. 1A and 1C. Throughout the remaining disclosure a generic term "rake angle $\alpha$" will be used in discussing this rotation of tool T to change a rake angle. Therefore, this generic term "rake angle $\alpha$" will mean the side rake $\alpha_s$, or the back rake angle $\alpha_b$, or both, depending on the axis of rotation of the cutting tool T. In other words, when changing the rake angle $\alpha$, there can be a change in the side rake angle $\alpha_s$, or the back rake angle $\alpha_b$, or both, depending on such axis of rotation. For example, of this axis were axis AM, there would be a change in both rake angles, and if this axis were AY, there would be a change of only the back rake angle $\alpha_b$, and if this axis were AX, only the side rake angle $\alpha_s$ would change. Thus, the term rake angle $\alpha$ may be defined generically as the angle betwen a rake face and a line perpendicular to the relative movement of the workpiece W, this relative movement being indicated by cutting velocity V.

With reference to FIGS. 2 and 3 there is shown a top view and side view, respectively, of one embodiment of a tool holder 10 for changing the rake angle. These figures also illustrate part of the circumference of a workpiece W in phantom lines, together with the cutting velocity V and a cutting force F. FIGS. 2 and 3 will be used to describe specifically a change in side rake angle.

The tool holder 10 includes a housing 12 which supports an integral, one-piece shank 14 for holding a cutting member or insert 16 which cuts the workpiece W and has the standard lathe tool geometry of cutting tool T shown in FIGS. 1A–1C. The cutting member 16 is releasably clamped on a block 18 of shank 14 by a clamp 20 which is tightened with, for example, a set screw 22, the block 18 being connected to a flange 24 of the shank 14.

Housing 12 has a stepped bore 26 for receiving the stepped segment 27 of shank 14 and rotatably supports the shank 14 with a plurality of bearings 28, 30 and 32, the bearing 28 being a thrust bearing to take up the cutting force F as will be further described. The housing 12 is bolted to a frame 34 with a plurality of bolt assemblies 36. A reversible motor 38 is also supported on the frame 34 and has, as shown in FIG. 3, an output shaft 40 which is secured within a bore 42 of shank 14 by a clamping device 44, such as a set screw. Upon energization, the motor 38 actuates or rotates the shaft 14. The motor 38 may be a DC or digital motor designed to rotate shank 14 a certain degree in response to its energization. Alternatively, motor 38 can be replaced by any suitable actuator to rotate shank 14, such as a magnetic positioning device having a plurality of spaced magnetizable elements about shaft 40, each of which, when magnetized, would cause rotation of the shank 14 a preset degree.

An electrically controlled brake 46, having a field coil assembly 48 and brake pads 50, is supported on frame 34 to releasably hold the shank 14 and prevent turning of the shaft due to any moments produced by the cutting force F during the cutting operation. Brake pads 50 normally grip the shank 14 when field coil assembly 48 is de-energized. For reasons which will be described, brake 46 is optional since the moments can be minimized and the shaft rotation prevented by the friction within the motor 38. A suitable brake 46 is manufactured by the Electroid Company, New Jersey.

A sensing device 52 is physically connected to the shank 14 near flange 24 to sense conditions of the cutting process. Device 52 may be a strain gauge which senses the cutting force F through changes in the physical quantity of stress in the shank 14. A control logic 54 responds to the output signal from sensing device 52 on line 56 to provide a control signal over line 58 to the motor 38 and brake 46 when a certain cutting condition is sensed. For example, if the cutting force F increases beyond a desirable amount, the device 52 will produce an output signal such that control logic 54 will energize field coil assembly 48 to release the shank 14 and energize motor 38 to rotate the shank a predetermined amount.

Housing 12 also has a cut-out 59 shown in FIG. 2 to receive a standard tool post (not shown) for clamping the entire tool holder 10 on a carriage (not shown). This will enable axial movement of the tool holder 10 to move the cutting member 16 into the workpiece W for cutting at a desired depth of cut.

The cutting member or insert 16, as already noted, is of the standard tool geometry shown in FIGS. 1A–1C and has a cutting tip 16a and a cutting edge 16b. It is important to note that the holding member or shank 14 is designed to hold the cutting member 16 such that upon rotation of the shank 14, the cutting member 16 will rotate about an axis through the cutting tip 16a, whereby the rake angle $\alpha$ will be changed. Moreover, by this rotation about an axis through tip 16a, not only will there be a change in rake angle $\alpha$, but advantageously there will be no change in the depth of cut made in the workpiece W. In the specific example of FIGS. 2 and 3, the cutting tip 16a rotates about an axis A (corresponding to axis AX in FIG. 1A) which also is the axis of rotation of the holding member 14 and is perpendicular to the axis of the workpiece W; however, as already noted the principles of the invention will apply if the cutting member 16 will rotate about any axis through tip 16a to change the rake angle. Furthermore, if the axis is AN, then it would be preferable to provide a tool holder with a cylindrical shank having an axis of rotation about AN.

As illustrated in FIG. 2, the cutting edge 16b is disposed along the axis A of the shank 14. Consequently, the cutting force F will produce only minimal moments on the shank 14, thereby tending only slightly to rotate the shank 14 during the cutting process. With the cutting member 16 thus aligned with the axis A of shank 14, the brake 46 may not be necessary since the friction within the motor 38 will counteract the minimal moment to prevent shaft rotation. However, if the cutting member 16 were clamped on block 18 with the cutting edge 16b offset from the axis of shank 14, as shown in dotted lines in FIG. 2, then sufficient moments may be produced by the cutting force F to require the use of brake 46.

The tool holder 10 can be operated to change the rake angle in the following manner. Prior to performing the cutting operation, the motor 38 and brake 46 can be energized by, for example, a simple on/off switch (not shown) coupling a power supply (not shown) through control logic 54 to rotate the shank 14 a desired amount in accordance with the optimum rake angle. Thus, with a given cutting member 16 supported on shank 14, the rake angle can be easily and quickly changed in dependence, for example, on the workpiece material, for example, steel or brass. After this rake angle is set, the motor 38 and brake device 46 will be deenergized and the entire tool holder 10 moved axially into the workpiece W to begin cutting the workpiece at a desired depth of cut. The workpiece W will then be rotated, and, during the cutting process, should the cutting force F, either in its magnitude and/or its direction, not be optimal, this will be sensed by sensing device 52 and control logic 54 to produce a control signal which will energize motor 38 and brake 46. Consequently, the shank 14 will rotate a set amount to change the rake angle and thereby change the cutting force without changing the depth of cut. As an alternative to setting the rake angle prior to cutting for a specific workpiece material, the workpiece can initially be cut at some rake angle. Immediately thereafter, if such rake angle is not optimum for the particular workpiece, an improper cutting force will be sensed to change the initial rake angle to an optimum angle. It will therefore be appreciated that the tool holder 10 advantageously comprises a compact adaptive machining control system to manipulate the rake angle using in-process force feedback.

In FIG. 3 the housing 12 is shown with the stepped bore 26 and the thrust bearing 28 which takes up the cutting force F. FIG. 4 shows an alternative embodiment of FIGS. 2 and 3 which is simpler and easier to make than the embodiment of FIGS. 2 and 3. FIG. 4 shows a tool holder 10' that is identical to the tool holder 10, as indicated by the like reference numerals, except for the housing 12 having a straight bore 26' rather than a stepped bore 26, and a shank 14' having a tapered segment 27' within the housing 12 rather than a stepped segment 27. Also, a tapered bearing 60 is coupled between the shank 14' and housing 12 within bore 26'. The advantages of this embodiment are that the tapered segment 27' will take up the thrust of the cutting force F, thereby not requiring a thrust bearing such as bearing 28, and the bore 26', being straight, will be easier to make than the stepped bore 26. FIG. 4 also shows the sensing device 52 being electrically connected to control logic 54 through small bores drilled through shank 14'; this may also be done for the embodiment of FIGS. 2 and 3.

FIGS. 4A and 4B illustrate a tool holder 62 which functions in the same manner as tool holders 10 and 10' to change the rake angle, but which is operated manually without force feedback. The tool holder 62 includes a housing 64 which rotatably supports a holding member or tapered shank 66. The cutting member 16 is mounted or held on one end of the shank 66 in a manner such that on rotation of the shank, the cutting member 16 will rotate about an axis through the cutting tip 16a to change the rake angle. The particular axis shown in FIG. 4A is the axis of rotation of the shank 66. A tapered lever 68 is fixedly connected through the shank 66 and has a pointer 70 which points to a scale 72 on the end of housing 64 indicating the degree of rotation of the shank 66. As will be appreciated, the rake angle can be changed manually by turning lever 68 a desired degree indicated by scale 72 to change the rake angle either before the cutting operation commences or during the cutting operation.

Also, since the lever 68 and shank 66 are tapered, the former can act as a lock for locking the latter in the housing 64. This is accomplished by pushing down on the lever 68 which will force the tapered shank 66 to the right, as viewed in FIG. 4A, more securely against housing 64.

FIG. 5A is an illustration of a tool holder 74 for specifically showing rotation of the back rake end projection b of the cutting member 16 to change the rake angle. The tool holder 74 includes a shank 76 having three bores 78, 80 and 82. The cutting member 16 is seated on a holding member 84 which is a circular segment that is rotatably seated on a circular guide surface 86 of the shank 76. As shown in FIG. 5B, circular segment 84 is guided in a circular path by a rail 88 on the segment 84 which slides in a channel 90 of shank 76. The cutting member 16 is firmly held on the circular segment 84 by a clamp 92 which includes a clamping arm 94 which clamps a deformable member 96 onto cutting member 16, the arm 94 being tightly secured on the deformable member 96 by a set screw 98 extending within bore 82. The arm 94 will move about a pivot 100 as the set screw 98 is turned to secure cutting member 16 on circular segment 84 through the deformable member 96, while still allowing the circular segment 84 to rotate in a circular path.

A linkage 102 includes a link 104 that slides through a guide member 106 supported within bore 78, a connecting link 106, and a link 108 pivotally connected at 110 to link 106 and fixedly connected to the circular segment 84. An actuator or motor, such as motor 38 described above, when energized, moves a cam surface 112 to which the end of link 104 is in continual contact to act as a cam follower. Rotation of the cam surface 112 by motor 38 will cause axial movement of the link 104 within bore 78 and axial movement of connecting link 106. Consequently, link 106 will cause link 108 to rotate a small distance within bore 80 to thereby rotate the circular segment or holding member 84 for the cutting member 16. The sensing device 52 is connected to shank 76 and electrically coupled through control logic 54 to energize motor 38 wherever a predetermined cutting condition such as excess cutting force is sensed. The shank 76 and motor 38 would be mounted on a common frame, such as frame 34, whereby tool holder 74 would also comprise a compact adaptive machine control system to manipulate the rake angle using in-process force feedback.

As with the previous described embodiments, the tool holder 74 is designed to rotate the cutting member 16 about an axis through its tip 16a to change the rake angle. In the specific embodiment of FIG. 5A, this axis would be the axis extending perpendicularly out of the plane of the figure, i.e., parallel to the axis of rotation of workpiece W. It is also important to note that the tool holder 74 is designed such that the cutting tip 16a is the center point of the circular guide surface 86 so that rotation of the segment 84 will cause a change in rake angle without a change in depth of cut during the cutting process.

The tool holder 74 can be operated in a similar manner as tool holder 10. That is, prior to cutting, motor 38 can be energized by closing a separate switch (not shown) to move linkage 102 and hence circular segment 84 a desired amount to change the rake angle. During in-process cutting of the workpiece W, the cutting force F will be sensed by strain gauge 52 and if this indicates an improper force, control logic 54 will energize motor 38 to automatically adjust the rake angle.

While the invention has been described in terms of rotation about an axis through the cutting tip, it will be appreciated that the principles of the invention will apply if there is rotation about an axis substantially near the cutting tip.

Thus far, there has been described changing the rake angle $\alpha$ by means of rotation of the cutting member holder such as shank 14 or circular segment 84. However, the rake angle $\alpha$ can also be changed by a more complicated movement than mere rotation, as evidenced in FIG. 6A, which shows the workpiece W, and the cutting tool T in both solid and phantom lines representing two tool positions. In the first position of tool T shown in full lines, the rake angle $\alpha$, specifically the back rake angle, will be $\alpha_b$. In the second position of tool T shown in phantom, the cutting tool tip A will have been moved by an angle $\theta$ to cut the workpiece W to the same diameter as in the first position. This will result in a change in rake angle from $\alpha_b$ to $\alpha_b + \theta$. This new rake angle $\alpha_b + \theta$ is obtained by moving the cutting tool T vertically upwardly from the first position and then inwardly into the workpiece W, as represented by the arrows in FIG. 6A.

FIG. 6B shows an adaptive in-process control apparatus 113 for changing the rake angle in the manner shown in FIG. 6A. The tool or cutting member T is held by a movable member or block 114 which is supported on a member 116 that moves the block 114 vertically. Member 116 includes two wedges 118 and 120 which are slidable relative to one another.

A carriage 122 mounts the wedge 120 and is slidable in the directions shown under the control of a carriage drive control 124 which may be part of a well-known numerical control (NC) machine programmed to move the cutting member T into the workpiece W for a desired depth of cut. Sensing device 52 is connected to the tool shank, with its output being fed to control logic 54 which activates actuator 38 and drive control 124. A screw 126 is rotatable by actuator 38 and threaded into wedge 118 to slide this wedge 118 along the surface of wedge 120.

In operation, if the cutting force F, either in its magnitude and/or its direction, is not optimal, this will be sensed by sensing device 52 and control logic 54 to produce a control signal which will activate actuator 38. Consequently, screw 126 will rotate to cause wedge 118 to slide, for example, upwardly along wedge 120 to thereby move block 114 and hence cutting member T upwardly a preset distance. Then, control 124, in response to the control signal from logic 52, will move carriage 122 to the left, as viewed in FIG. 6B, together with member 116 and block 114, a preset distance. Consequently, cutting member T will move towards workpiece W a preset distance to, for example, cut the workpiece to the same diameter prior to rake angle change.

While the invention has been described in terms of rotation about an axis through or near the cutting tip, it will be appreciated that the principles of the invention will apply if there is rotation about an axis which is even distant from the cutting tip. However, with rotation about such distant axis, there would be required an additional translational motor of the cutting tip to maintain the same depth of cut.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for removing material from a workpiece with a cutting member having a rake face and a cutting tip, the rake face and a line perpendicular to the relative movement of the workpiece and the cutting member forming a rake angle, comprising:
   (a) rotatable means for holding the cutting member;
   (b) means for rotating said rotatable holding means to change the rake angle; and
   (c) brake means for releasably gripping said rotatable holding means to securely hold the cutting member when removing the material from the workpiece, including an energizable coil and brake pads movable in response to energization of said coil.

2. Apparatus for removing material from a workpiece with a cutting member having a rake face and a cutting tip, the rake face and a line perpendicular to the relative movement of the workpiece and the cutting member forming a rake angle, comprising:
   (a) rotatable means for holding the cutting member to rotate about an axis through the cutting tip;
   (b) means for rotating said rotatable holding means to change the rake angle; and
   (c) brake means for releasably gripping said rotatable holding means to securely hold the cutting member when removing the material from the workpiece, including an energizable coil and brake pads movable in response to energization of said coil.

* * * * *